(12) United States Patent
Kissane

(10) Patent No.: US 8,138,695 B2
(45) Date of Patent: Mar. 20, 2012

(54) SERIES ELECTRIC ENGINE POWER DRIVE WITH RHEOSTAT AND BATTERY FEEDBACK

(76) Inventor: John Kissane, Far Hills, NJ (US)

( * ) Notice: Subject to any disclaimer, the term of this patent is extended or adjusted under 35 U.S.C. 154(b) by 315 days.

(21) Appl. No.: 12/590,624

(22) Filed: Nov. 12, 2009

(65) Prior Publication Data

US 2011/0109183 A1    May 12, 2011

(51) Int. Cl.
    *H02P 1/00*    (2006.01)
(52) U.S. Cl. ........ 318/139; 318/140; 318/148; 318/149; 318/150; 318/151

(58) Field of Classification Search .................. 318/139, 318/140, 148–153
See application file for complete search history.

(56) References Cited

U.S. PATENT DOCUMENTS

| | | | | |
|---|---|---|---|---|
| 3,769,566 A | * | 10/1973 | Mehta | 318/375 |
| 5,384,520 A | * | 1/1995 | Yang | 318/79 |
| 5,557,179 A | * | 9/1996 | Yang | 318/41 |

* cited by examiner

*Primary Examiner* — Walter Benson
*Assistant Examiner* — David Luo

(57) ABSTRACT

The motor generator set described here has unique circuitry which allows for the combined electrical output of two generators to be paired up with one another as well as the output of a battery in a manner that maximizes there output. Diodes are provided in this circuitry to direct the flow of current effectively.

1 Claim, 1 Drawing Sheet

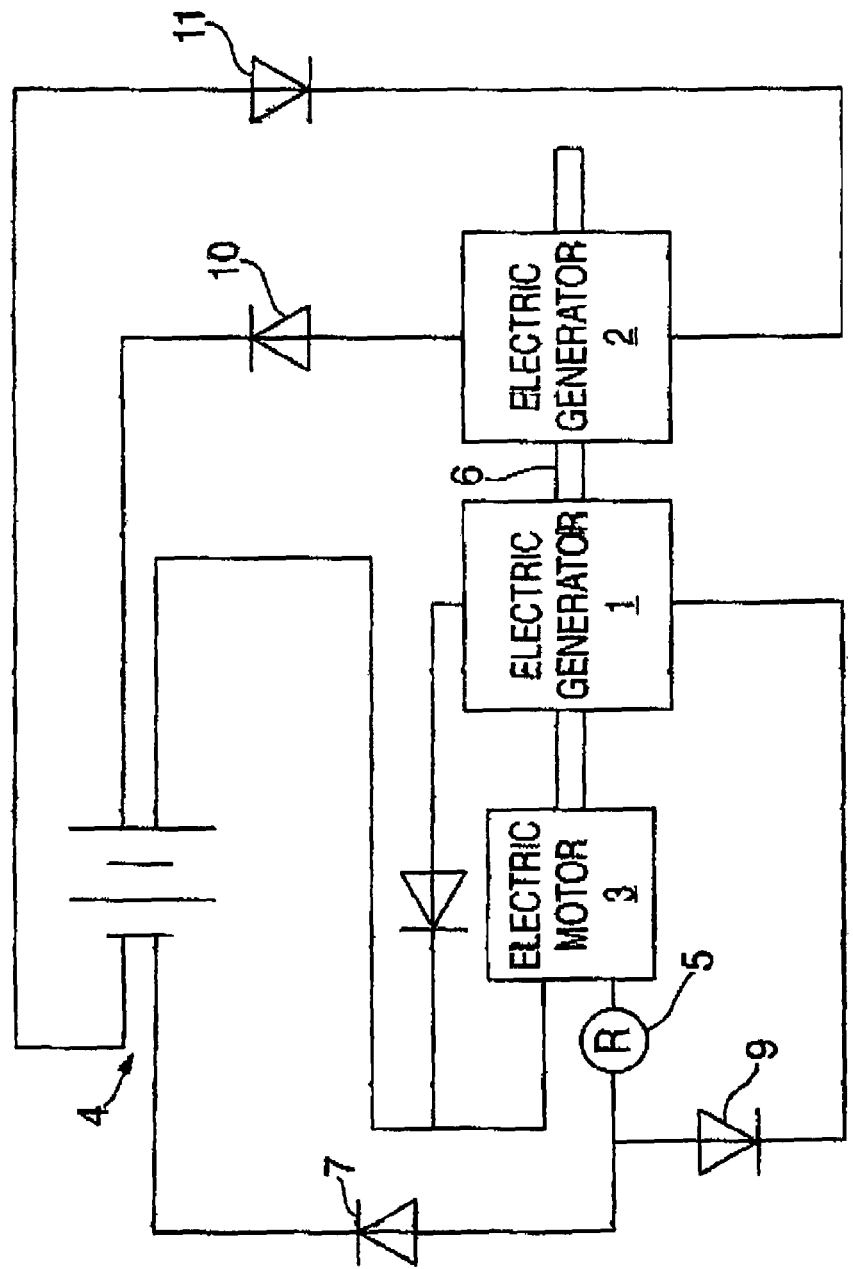

SERIES ELECTRIC ENGINE POWER DRIVE WITH RHEOSTAT AND BATTERY FEEDBACK

CROSS-REFERENCE TO RELATED APPLICATIONS

Improvement on application Ser. No. 12/584,191

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to a unique motor generator set. In particular to a motor generator set where in the output of a pair of generators is fed back to a battery as well as directly to an electric motor.

In the past motor generator sets have been used in automobiles where the electric generated by the generator is sent back to the battery. This only resulted in charging the battery.

BRIEF SUMMARY OF THE INVENTION

The present invention comprises a motor driven set of generators where in the output of one generator is sent back directly to the electric motor, while the output of the other generator is sent back to recharge the battery. These generators are set at 120 degrees apart. Therefore they comprise two separate electrical phases. Means are also provided (by use of diodes) to direct the output of generator 1 directly into the electric motor.

BRIEF DESCRIPTION OF THE DRAWING

The drawing shows a schematic illustration of the motor generator invention where in the output of one generator is sent back directly to an electric motor while the other is sent to the battery. There is also a rheostat that controls the input into the electric motor. The electric motor as well as the two generators Are connected by a central shaft. Furthermore the two generators are set at 120 degrees apart.

DETAILED DESCRIPTION OF THE INVENTION

Referring more particularly to the drawing, a battery 4 is connected to the input of the electric motor 3 to energize the motor. The electric motor is then connected to two generators set 120 degrees apart. The first of the generators (electric generator 1) sends electricity directly back to the electric motor with diodes 7,8,9 directing the path for the current to take. The second generator (electric generator 2) which is set at 120 degrees apart from the first sends its electricity generated back to the battery. The electric motor, generator 1, and generator 2 are all connected by a central shaft so when the motor is energized the central shaft rotates and causes rotation in the two electric generators thereby Producing electricity in said generators. There is also a rheostat (5) which is located directly in front of the electric motor and controls the electricity flowing into the electric motor. This could be controlled by a gas pedal in an automobile for example. Means are also provided by diodes 10,11 for the electricity produced by electric generator 2 to be directed back to the battery aid in its being recharged, as well as producing a sine wave form of electricity (alternating current) proceeding from the battery. This alternating current from electric generator 2 with the charge from the battery would then pair up with the electricity from generator 1 which was set at 120 degrees apart and be directed into the battery in a controlled manner by the rheostat 5. All of this results in a series electric engine power drive system which would have the torque capable of driving an electric automobile.

What I claim as my invention is:

1. Unique circuitry for a motor generator set with two generators set at 120 degrees apart all connected by a central shaft, diodes directing electricity from electric generator 1 directly into the motor through a rheostat, as well as diodes directing electricity from generator 2 to the battery thereby recharging the battery as well as converting its direct current DC into alternating current AC which then pairs up with the electricity from generator 1 in a manner which doubles up the two voltages before heading into the electric motor through a rheostat, all of this is accomplished by use of diodes in the circuitry.

* * * * *